United States Patent
Ueda (10) Patent No.: US 10,156,404 B2
(45) Date of Patent: Dec. 18, 2018

(54) HEAT EXCHANGER FOR AIRCRAFT ENGINE

(71) Applicant: SUMITOMO PRECISION PRODUCTS CO., LTD., Hyogo (JP)

(72) Inventor: Tatsuya Ueda, Amagasaki (JP)

(73) Assignee: SUMITOMO PRECISION PRODUCTS CO., LTD., Hyogo (JP)

( * ) Notice: Subject to any disclaimer, the term of this patent is extended or adjusted under 35 U.S.C. 154(b) by 16 days.

(21) Appl. No.: 15/507,450

(22) PCT Filed: Oct. 14, 2015

(86) PCT No.: PCT/JP2015/005193
§ 371 (c)(1),
(2) Date: Feb. 28, 2017

(87) PCT Pub. No.: WO2016/063497
PCT Pub. Date: Apr. 28, 2016

(65) Prior Publication Data
US 2017/0284750 A1 Oct. 5, 2017

(30) Foreign Application Priority Data
Oct. 21, 2014 (WO) .................. PCT/JP2014/005343

(51) Int. Cl.
*F02C 7/18* (2006.01)
*F28D 1/03* (2006.01)
(Continued)

(52) U.S. Cl.
CPC ............... *F28F 3/025* (2013.01); *F02C 7/18* (2013.01); *F28D 1/03* (2013.01); *F28D 1/0308* (2013.01);
(Continued)

(58) Field of Classification Search
CPC ...... F28F 3/025; F28F 1/24; F28F 1/34; F28F 3/12; F28F 1/12; F28F 1/26; F02C 7/18;
(Continued)

(56) References Cited

U.S. PATENT DOCUMENTS

| 5,484,122 A * | 1/1996 | DeSalve ................ B64D 13/00 244/117 A |
| 2008/0095611 A1 * | 4/2008 | Storage ................. F01D 25/125 415/116 |

(Continued)

FOREIGN PATENT DOCUMENTS

| JP | S59-229193 A | 12/1984 |
| JP | H03-225117 A | 10/1991 |

(Continued)

OTHER PUBLICATIONS

International Search Report issued in PCT/JP2015/005193; dated Dec. 8, 2015.

*Primary Examiner* — Justin M Jonaitis
(74) *Attorney, Agent, or Firm* — Studebaker & Brackett PC (57) ABSTRACT

A heat exchanger for an aircraft engine that allows improvement in heat exchange ratio is provided. The heat exchanger (1) includes a plurality of heat dissipating fins (20, 30). The plurality of heat dissipating fins (20, 30) are arranged on at least one of a surface (2) and a surface (3). Each of the heat dissipating fins (20, 30) has a plate-like shape and has an inlet-side upper edge disposed on the side where a swirl flow (AF1) flows in and an outlet-side upper edge disposed on the side opposite the inlet-side upper edge and on the side where the swirl flow (AF1) flows out, and the inlet-side upper edge intersects the axis of rotation of a fan and extends along the direction in which the swirl flow (AF1) flows at the inlet-side upper edge.

7 Claims, 11 Drawing Sheets

(51) Int. Cl.
*F28F 1/12* (2006.01)
*F28F 1/24* (2006.01)
*F28F 1/32* (2006.01)
*F28F 1/34* (2006.01)
*F28F 3/02* (2006.01)
*F28F 3/12* (2006.01)
*F28D 21/00* (2006.01)

(52) U.S. Cl.
CPC .................. *F28F 1/24* (2013.01); *F28F 1/32* (2013.01); *F28F 1/34* (2013.01); *F28F 3/12* (2013.01); *F05D 2250/71* (2013.01); *F05D 2260/213* (2013.01); *F05D 2260/22141* (2013.01); *F28D 2021/0021* (2013.01); *F28F 1/12* (2013.01)

(58) Field of Classification Search
CPC ........... F28D 1/0308; F28D 2021/0021; F05D 2250/71; F05D 2260/213; F05D 2260/22141; F05D 2220/323; F05D 2260/232; F05D 2300/173; B21D 53/022; B21D 35/003; F02K 3/06; F04D 29/584

USPC ....... 165/185, 51, 47, 41, 44, 52, 54, 55, 56
See application file for complete search history.

(56) References Cited

U.S. PATENT DOCUMENTS

| 2009/0165995 | A1* | 7/2009 | Bajusz | F01D 25/02 |
| | | | | 165/51 |
| 2011/0146229 | A1 | 6/2011 | Bajusz et al. | |
| 2014/0044525 | A1* | 2/2014 | Storage | F28F 3/12 |
| | | | | 415/144 |
| 2015/0000865 | A1* | 1/2015 | Ueda | F28F 3/02 |
| | | | | 165/51 |

FOREIGN PATENT DOCUMENTS

| JP | 2002-155758 A | 5/2002 |
| JP | 2003-130354 A | 5/2003 |
| JP | 2008-144752 A | 6/2008 |
| JP | 5442916 B1 | 3/2014 |

* cited by examiner

HEAT EXCHANGER FOR AIRCRAFT ENGINE

TECHNICAL FIELD

The present invention relates to a heat exchanger, and particularly to a heat exchanger for an aircraft engine.

BACKGROUND ART

An aircraft engine represented by a gas turbine engine incorporates a heat exchanger. A heat exchanger for an aircraft engine is used to cool the lubricant in the aircraft engine and cool the lubricant in a generator incorporated in the aircraft engine. Examples of the heat exchanger for an aircraft engine include a plate-fin-type heat exchanger, a shell-and-tube-type heat exchanger, and a surface-type heat exchanger.

Among the heat exchangers described above, the surface-type heat exchanger can be made compact as compared with the other heat exchangers. Such a surface-type heat exchanger is proposed, for example, in Japanese Patent Application Publication No. 2008-144752 (Patent Literature 1) and Japanese Patent No. 5,442,916 (Patent Literature 2).

The surface-type heat exchangers disclosed in Patent Literatures 1 and 2 each have an arcuately-curved-plate-like shape. The heat exchanger is disposed along a curved surface of an aircraft engine. The curved surface of an aircraft engine is, for example, the inner or outer circumferential surface of a fan case or an engine core casing. More specifically, the surface-type heat exchanger is disposed, for example, on the inner circumferential surface of the fan case or the outer circumferential surface of the engine core casing. The surface-type heat exchanger has a curved shape curved along the curved surface of the location where the heat exchanger is disposed.

The surface of the surface-type heat exchanger is exposed to an air flow passing through the aircraft engine. A plurality of heat dissipating fins are disposed on a surface of the surface-type heat exchanger. The plurality of heat dissipating fins extend in the direction of the axis of rotation of the aircraft engine and are arranged in the circumferential direction of the aircraft engine. The heat exchanger further has an internal channel.

A fluid, such as the lubricant described above, (hereinafter referred to as target fluid) flows into the surface-type heat exchanger and flows through the internal channel. The plurality of heat dissipating fins on a surface of the surface-type heat exchanger are exposed to the air flow. The heat of the target fluid in the channel is therefore dissipated to the outside via the heat dissipating fins. The cooled target fluid flows out of the heat exchanger and returns to an apparatus where the target fluid is used (such as generator).

As described above, the surface-type heat exchanger is disposed along an arbitrary curved surface of an aircraft engine. Resistance of the air flow flowing through the engine is therefore smaller than the resistance in the other heat exchangers.

In a surface-type heat exchanger, a plurality of heat dissipating fins arranged on a surface of the heat exchanger extend along the axis of rotation of an aircraft engine, as described above. The heat dissipating fins of each of the surface-type heat exchangers disclosed in Patent Literatures 1 and 2 described above also extend along the axis of rotation of the aircraft engine. In this case, the heat exchange efficiency is maximized when the air flow flowing along the heat dissipating fins flows along the axis of rotation. In an aircraft engine, however, for example, an air flow, when it passes through a fan, is converted into a swirl flow. The swirl flow does not flow along the axis of rotation but flows in a direction that intersects the axis of rotation. Accordingly, the direction in which the heat dissipating fins extend intersects the air flow (the swirl flow). In this case, a high heat exchange ratio is unlikely to be achieved.

SUMMARY OF INVENTION

An object of the present invention is to provide a heat exchanger that allows improvement in the heat exchange ratio.

A heat exchanger according to an embodiment of the present invention is a heat exchanger for an aircraft engine that is allowed be disposed on a curved surface which is part of the aircraft engine and along which a swirl flow flows. The heat exchanger includes a main body and a plurality of heat dissipating fins. The main body has a plate-like shape curved along the curved surface includes an internal channel through which a fluid is allowed to flow, and has a first surface so disposed as to face the curved surface and a second surface on the side opposite the first surface. The plurality of heat dissipating fins are arranged on at least one of the first and second surfaces. Each of the heat dissipating fins has a plate-like shape and has an inlet-side upper edge disposed on the side where the swirl flow flows in and an outlet-side upper edge disposed on the side opposite the inlet-side upper edge and on the side where the swirl flow flows out, and the inlet-side upper edge intersects the axis of rotation of a fan and extends along the direction in which the swirl flow flows at the inlet-side upper edge.

The heat exchanger according to the present embodiment allows improvement in heat exchange ratio.

DESCRIPTION OF EMBODIMENTS

A heat exchanger according to an embodiment of the present invention is a heat exchanger for an aircraft engine that is allowed be disposed on a curved surface which is part of the aircraft engine and along which a swirl flow flows. The heat exchanger includes a main body and a plurality of heat dissipating fins. The main body has a plate-like shape curved along the curved surface includes an internal channel through which a fluid is allowed to flow, and has a first surface so disposed as to face the curved surface and a second surface on the side opposite the first surface. The plurality of heat dissipating fins are arranged on at least one of the first and second surfaces. Each of the heat dissipating fins has a plate-like shape and has an inlet-side upper edge disposed on the side where the swirl flow flows in and an outlet-side upper edge disposed on the side opposite the inlet-side upper edge and on the side where the swirl flow flows out, and the inlet-side upper edge intersects the axis of rotation of a fan and extends along the direction in which the swirl flow flows at the inlet-side upper edge.

For example, an air flow having passed through a fan in the aircraft engine is converted into a swirl flow, which then flows in a direction that intersects the axis of rotation of the fan. As described above, the inlet-side upper edge of each of the heat dissipating fins intersects the axis of rotation and extends along the direction in which the swirl flow flows at the inlet-side upper edge. Therefore, on the inlet side of the plurality of heat dissipating fins, collision between the swirl flow and the heat dissipating fins can be avoided, whereby the swirl flow tends to flow between the plurality of heat dissipating fins. The heat exchange ratio is therefore improved.

It is preferable that the outlet-side upper edge intersects the axis of rotation of the fan and extends in the direction in which the swirl flow flows at the outlet-side upper edge.

In this case, the area of part of the heat dissipating fins or the area of a portion extending along the direction in which the swirl flow flows increases. As a result, the swirl flow is more likely to flow between the plurality of heat dissipating fins, and the heat exchange ratio is therefore improved.

The heat dissipating fins preferably extend along the direction in which the swirl flow flows over the surface on which the heat dissipating fins are arranged.

In this case, the area of part of the heat dissipating fins or the area of the portion extending along the direction in which the swirl flow flows further increases. As a result, the swirl flow is more likely to flow between the plurality of heat dissipating fins, and the heat exchange ratio is therefore improved.

The plurality of heat dissipating fins preferably include first and second heat dissipating fins. The first heat dissipating fins are each so configured that at least the inlet-side upper edge intersects the axis of rotation at a first intersection angle. The second heat dissipating fins are each so configured that at least the inlet-side upper edge intersects the axis of rotation at an intersection angle different from the first intersection angle.

Also on the surface of the heat exchanger, the direction of the swirl flow varies depending on the location on the surface in some cases. In the case described above, the inlet-side upper edges of the first and second heat dissipating fins intersect the axis of rotation at different intersection angles. The plurality of heat dissipating fins can therefore be arranged in accordance with the directions of the swirl flows on the location basis, and the heat exchange ratio is therefore increased.

A portion including the inlet-side upper edge of the heat dissipating fin is preferably bent in the direction in which the plurality of heat dissipating fins are arranged.

In this case, the inlet-side upper edge of the heat dissipating fin is readily allowed to extend along the swirl flow by bending the portion including the inlet-side upper edge.

It is preferable that the portion including the inlet-side upper edge of the heat dissipating fin is bent in the direction in which the plurality of heat dissipating fins are arranged, and that a portion including the outlet-side upper edge of the heat dissipating fin is bent in the direction in which the plurality of heat dissipating fins are arranged and toward the side opposite the portion including the inlet-side upper edge.

In this case, the inlet-side upper edge and the outlet-side upper edge of the heat dissipating fin are readily allowed to extend along the swirl flow by bending the portion including the inlet-side upper edge and the portion including the outlet-side upper edge.

The heat exchanger preferably includes a plurality of heat dissipating fins on the first and second surfaces.

In this case, since the heat exchanger includes a plurality of heat dissipating fins on the two surfaces, the heat exchange ratio is further increased.

The heat exchanger according to embodiments of the present invention will be described below in detail with reference to the drawings. In the drawings, the same or corresponding portions have the same reference characters and will not be described repeatedly.

First Embodiment

[Overall Configuration of Heat Exchanger]

Figure 1:
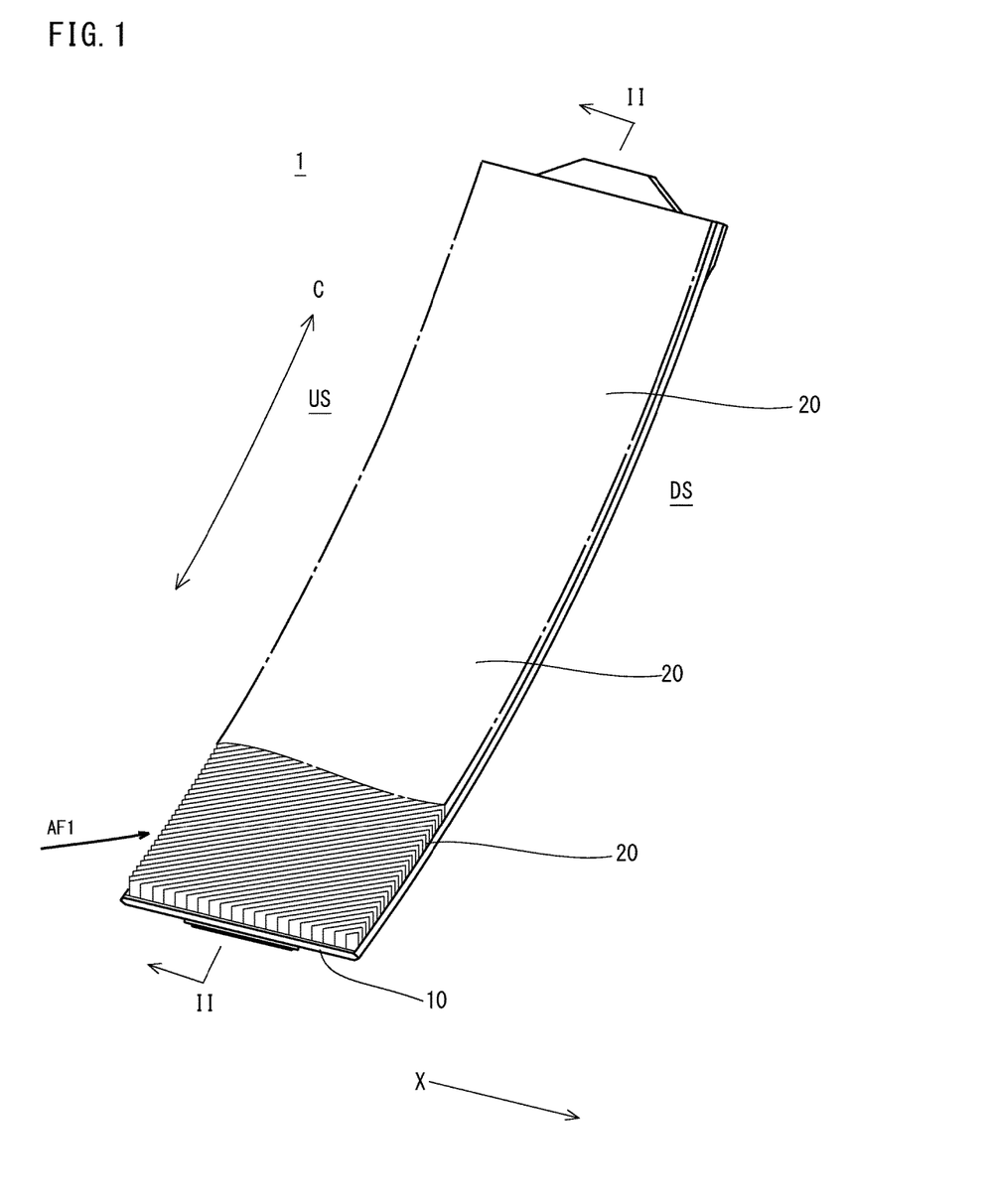
FIG. 1 is a perspective view of a heat exchanger for an aircraft engine according to a first embodiment.

FIG. 1 is a perspective view of a heat exchanger for an aircraft engine according to the present embodiment. The heat exchanger 1 according to the present embodiment is disposed along a curved surface of an aircraft engine (not shown) including a fan.

The aircraft engine is, for example, a turbofan engine. The curved surface of the aircraft engine is, for example, any of the inner and outer circumferential surfaces of a fan casing and the inner and outer circumferential surfaces of an engine core casing. In FIG. 1, the heat exchanger 1 is disposed on the inner circumferential surface of the fan casing by way of example. The heat exchanger 1 according to the present embodiment may, however, be disposed on a curved surface of another engine member other than the fan casing and the engine core casing. The location on the curved surface where the heat exchanger is disposed is not limited to a specific location and can be any location where the swirl flow formed by the fan flows. The heat exchanger may be disposed on a curved surface upstream of the fan or a curved surface downstream of the fan. The swirl flow occurs both on the upstream and downstream sides of the fan. The heat exchanger 1 only needs to be disposed on a curved surface which is part of the aircraft engine and along which the swirl flow flows.

Referring to FIG. 1, the heat exchanger 1 has an arcuately-curved-plate-like shape and is what is called a surface-type heat exchanger. In the aircraft engine, the heat exchanger 1 is curved in correspondence with the curved surface (not shown) where the heat exchanger 1 is disposed. In FIG. 1, the heat exchanger 1 is curved along a circumferential direction C of the inner circumferential surface of the fan casing.

The X axis in FIG. 1 represents the axis of rotation X (direction) of the fan of the aircraft engine that is not shown. The length of the heat exchanger 1 in the circumferential direction C is about ⅛ of the circumferential length of the curved surface of the aircraft engine where the heat exchanger 1 is disposed (fan casing in FIG. 1). The length of the heat exchanger 1 is, however, not limited to a specific value. The heat exchanger 1 may, for example, have an annular shape that extends substantially over the entire length of the fan casing in the circumferential direction.

Figure 2:
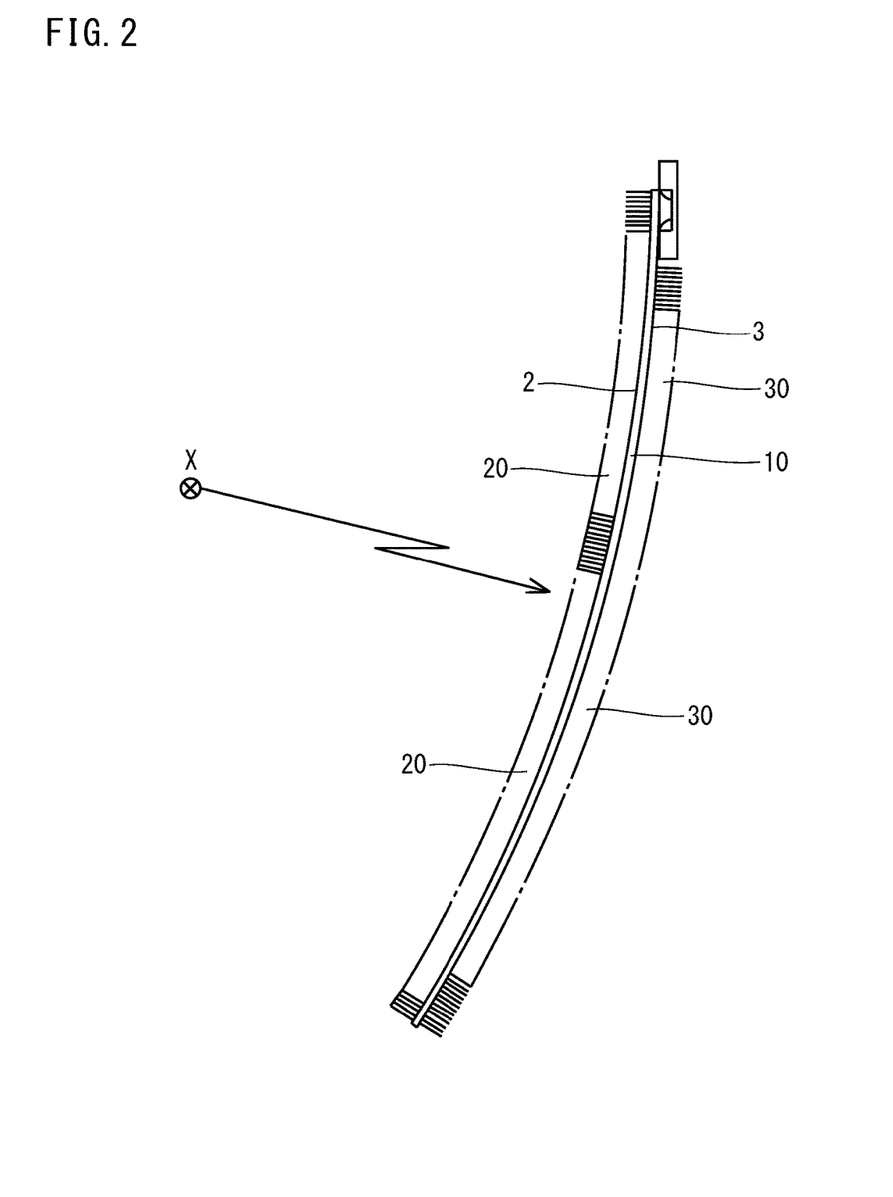
FIG. 2 is a cross-sectional view taken along the II-II plane in FIG. 1.

In FIG. 1, the left side of the heat exchanger 1 is an inlet side (upstream side) US, to which an air flow (swirl flow) flows in, and the right side of the heat exchanger 1 is an outlet side (downstream side) DS, out of which the air flow flows. The heat exchanger 1 causes a fluid that is a target to be cooled (hereinafter referred to as target fluid) to flow through the interior of the heat exchanger 1 and cools the target fluid. FIG. 2 is a cross-sectional view taken along the II-II plane in FIG. 1. Referring to FIGS. 1 and 2, the heat exchanger 1 includes a plate-shaped main body 10 having a surface 2 and a surface 3. The surface 3 is so disposed as to face the curved surface of the aircraft engine (inner circumferential surface of fan casing in present example). The surface 2 is disposed on the side opposite the surface 3. The surface 3 is not in contact with the curved surface but fixed thereto with a gap provided between the surface 3 and the curved surface. For example, the surface 3 is fixed via an attachment member that is not shown in such a way that the surface 3 faces the curved surface with a gap provided between the surface 3 and the curved surface.

Figure 3:
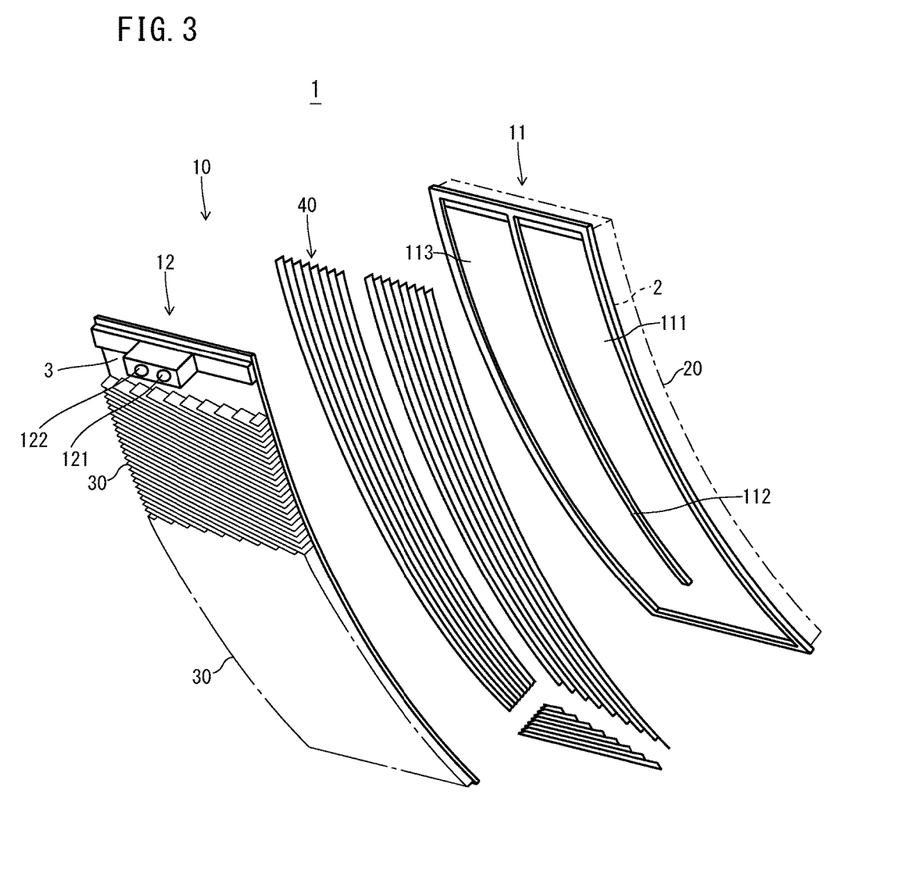
FIG. 3 is an exploded perspective view of the heat exchanger shown in FIG. 1.

A plurality of heat dissipating fins 20 and 30 are arranged on the surfaces 2 and 3, respectively. The plurality of heat dissipating fins 20 stand on the surface 2. The plurality of heat dissipating fins 20 are arranged in a direction roughly perpendicular to the direction in which the heat dissipating fins 20 extend. Similarly, the plurality of heat dissipating fins 30 stand on the surface 3 and are arranged in a direction roughly perpendicular to the direction in which the heat dissipating fins 30 extend. In FIGS. 1 to 3, the area where the plurality of heat dissipating fins 20 and 30 are arranged is indicated by the dashed lines, and part of the plurality of heat dissipating fins 20 and 30 is omitted.

FIG. 3 is an exploded perspective view of the heat exchanger 1. The main body 10 includes a plate-shaped member 11 and a plate-shaped member 12. The main body 10 is made, for example, of aluminum or an aluminum alloy. The main body 10 may instead be made, for example, of stainless steel, titanium, copper, Inconel (trademark). The heat dissipating fins 20 and 30 are made of the same material as that of the main body 10.

The member 11 and the member 12 are layered on each other in the thickness direction thereof into the main body 10 having the shape of an enclosure. A plurality of corrugated fins 40 are disposed in the main body 10. The member 11, the member 12, and the corrugated fins 40 are bonded to each other, for example, in a brazing process.

The space in the main body 10 is partitioned by a partition 112 into an inward path 111 and an outward path 113. Part of the corrugated fins 40 is disposed in the inward path 111. The corrugated fins 40 partition the inward path 111 into a plurality of minute channels. Similarly, another part of the corrugated fins 40 is disposed in the outward path 113 and partition the outward path 113 into a plurality of minute channels. The inward path 111 and the outward path 113 communicate with each other in the main body 10 and form a channel through which the target fluid flows.

The member 12 has a flow entrance 121 and a flow exit 122 provided in the surface 3. The target fluid flows into the heat exchanger 1 via the flow entrance 121. The target fluid is distributed into the minute channels separated by the corrugated fins 40 and flows into the main body 10 via the inward path 111 and the outward path 113 in this order. In this process, heat exchange between the target fluid in the main body 10 and an external air flow is performed via the corrugated fins 40 and the heat dissipating fins 20 and 30, whereby the target fluid is cooled. The cooled target fluid flows out of the heat exchanger 1 through the flow exit 122 and returns to an apparatus in which the target fluid is used (such as engine core and generator).

[Heat Dissipating Fins 20]

Referring to FIG. 1, the heat dissipating fins 20 extend in a direction that intersects the axis of rotation X of the fan of the aircraft engine. More specifically, the heat dissipating fins 20 extend along a swirl flow AF1 flowing over part of the curved surface of the aircraft engine or the curved surface along which the heat exchanger 1 is disposed.

An air flow flowing in an aircraft engine is not always parallel to the direction of the axis of rotation of the aircraft engine. In particular, in an aircraft engine including a fan, such as a turbofan engine, the air flow, when it passes through the fan, is converted into a swirl flow. That is, in a position downstream of the fan, in particular, the fan swirls the air flow (swirl flow), and the swirl flow flows in a direction that intersects the axis of rotation X.

Figure 4:
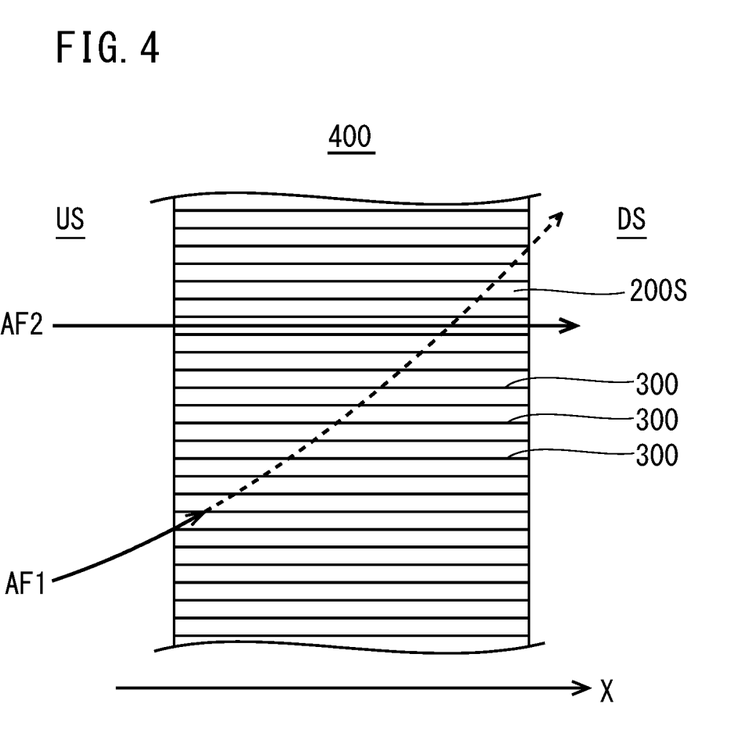
FIG. 4 is a plan view of a heat exchanger having heat dissipating fins extending along an axis of rotation.

Consider a case where a plurality of heat dissipating fins 300 arranged on a surface 200S of a heat exchanger 400 extend (substantially in parallel to) along the axis of rotation X, as shown in FIG. 4. When the air flow flows along the axis of rotation X, an air flow AF2 flows over the entire length of the heat dissipating fins 300, as labeled with AF2 in FIG. 4. Therefore, in this case, collision between the air flow AF2 and the heat dissipating fins 300 on the inlet side of the heat exchanger 400 is avoided, and the air flow AF2 readily flows between the plurality of heat dissipating fins 300. As a result, the speed of the air flow AF2 is unlikely to decrease, and the length over which the heat dissipating fins 300 come into contact with the air flow AF2 increases. The heat exchange ratio is therefore increased.

On the other hand, when the air flow is a swirl flow, such as the flow labeled with AF1, the swirl flow AF1 flows in a direction that intersects the axis of rotation X. The swirl flow AF1 therefore collides with the heat dissipating fins 300 on the inlet side US of the heat dissipating fins 300. In this case, the swirl flow AF1 is deflected due to the collision and tends to flow toward the outside instead of flowing between the plurality of heat dissipating fins 300 (upward from heat dissipating fins 300, for example).

In short, even when the swirl flow AF1 flows into the space between the plurality of heat dissipating fins 300 adjacent with each other, the swirl flow AF1 flows toward the outside in the course of the heat dissipating fins 300. The swirl flow AF1 is therefore unlikely to flow over the entire length of the heat dissipating fins 300. The heat exchange ratio therefore decreases, as compared with the case where the air flow AF2 flows over the heat exchanger 400.

Figure 5:
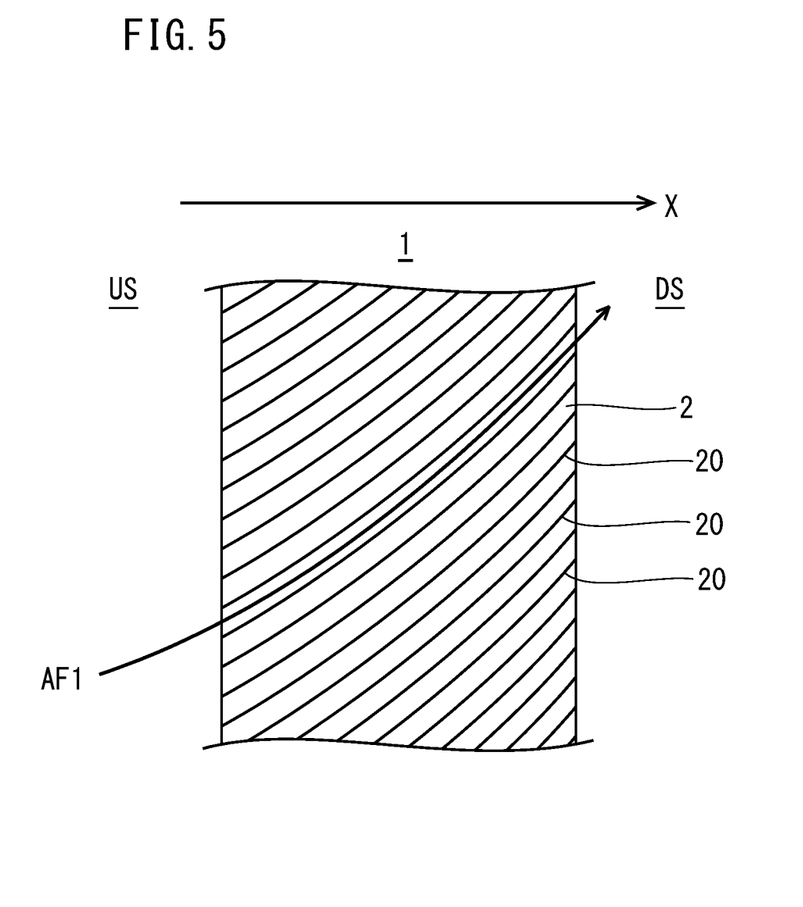
FIG. 5 is a plan view of the heat exchanger shown in FIG. 1.

In view of the situation described above, in the present embodiment, the heat dissipating fins 20 extend in a direction that intersects the axis of rotation X, more specifically, the heat dissipating fins 20 extend along the direction in which the swirl flow passing by the surface 2 flows, as shown in FIGS. 1 and 5. In this case, the swirl flow AF1 is unlikely to collide with the heat dissipating fins 20 on the side where the swirl flow AF1 flows in, and the swirl flow AF1 readily tends to flow into the spaces between the plurality of heat dissipating fins 20. Further, since the heat dissipating fins 20 extend along the direction in which the swirl flow AF1 flows, the swirl flow AF1 tends to flow over the entire length of the heat dissipating fins 20. The heat exchange ratio is therefore increased, as compared with the heat exchange ratio provided by the heat dissipating fins 300 shown in FIG. 4.

In FIG. 4 and the following figures, which are plan views of heat exchanger, the heat dissipating fins are diagrammatically expressed with "lines." It is, however, noted that each of the heat dissipating fins has in practice a plate-like shape having a width.

The direction in which the swirl flow flows varies on an area basis over the curved surface of the aircraft engine. The direction in which the swirl flow flows in each area of the curved surface can, however, be readily determined, for example, by running a simulation on the basis of the specifications of the aircraft engine (such as shape of curved surface and size and shape of fan). Therefore, for example, the direction of the swirl flow on the curved surface on which the heat exchanger 1 is disposed can be analyzed by running a simulation, and the direction in which the heat dissipating fins 20 should extend can be determined on the basis of the direction of the swirl flow obtained by the analysis.

In the present embodiment, the state in which the heat dissipating fins 20 extend along the swirl flow AF1 includes not only a state in which the heat dissipating fins 20 extend in parallel to the swirl flow AF1 but also, for example, a state in which the heat dissipating fins 20 intersect the swirl flow AF1 at an angle of ±15° or less.

In FIG. 5, the heat dissipating fins 20 extend on the surface 2 in a curved direction along the swirl flow. It is, however, noted that the heat dissipating fins 20 may instead extend linearly. Further, the heat dissipating fins 20 and 30 can be manufactured, for example, by cutting, precise casting, and laminate shaping.

[Heat Dissipating Fins 30]

Referring to FIG. 3, the heat dissipating fins 30, which are disposed on the surface 3, also extend in a direction that intersects the axis of rotation X, as the heat dissipating fins 20 do. More specifically, the heat dissipating fins 30 extend along the swirl flow flowing over the surface 3. As described above, the surface 3 faces the curved surface and is fixed thereto with a gap between the surface 3 and the curved surface. The swirl flow therefore flows between the surface 3 and the curved surface.

The heat dissipating fins 30 extend along the swirl flow flowing over the surface 3, as the heat dissipating fins 20 do. In this case, the swirl flow AF1 tends to flow between the plurality of heat dissipating fins 30 adjacent to each other, whereby the heat exchange ratio is increased, as in the case of the heat dissipating fins 20.

In the embodiment described above, the heat exchanger 1 includes the heat dissipating fins (20, 30) both on the surfaces 2 and 3. It is, however, noted that the heat exchanger 1 only needs to include the plurality of heat dissipating fins 20 or 30 described above on at least one of the surfaces 2 and 3. That is, the heat exchanger 1 may include the plurality of heat dissipating fins 20 on the surface 2 but no heat dissipating fins on the surface 3. Instead, the heat exchanger 1 may include no heat dissipating fins on the surface 2 but heat dissipating fins on the surface 3.

In a case where no heat dissipating fins 30 are formed on the surface 3, which is so disposed as to face the curved surface of the aircraft engine, the surface 3 may be in contact with the curved surface and fixed thereto.

Second Embodiment

In the first embodiment, the plurality of heat dissipating fins formed on the surfaces of the heat exchanger extend in parallel to each other. That is, each of the heat dissipating fins intersects the axis of rotation X at a fixed intersection angle. Instead, a plurality of heat dissipating fin groups that intersect one another at different intersection angles may be formed on the surfaces.

Figure 6:
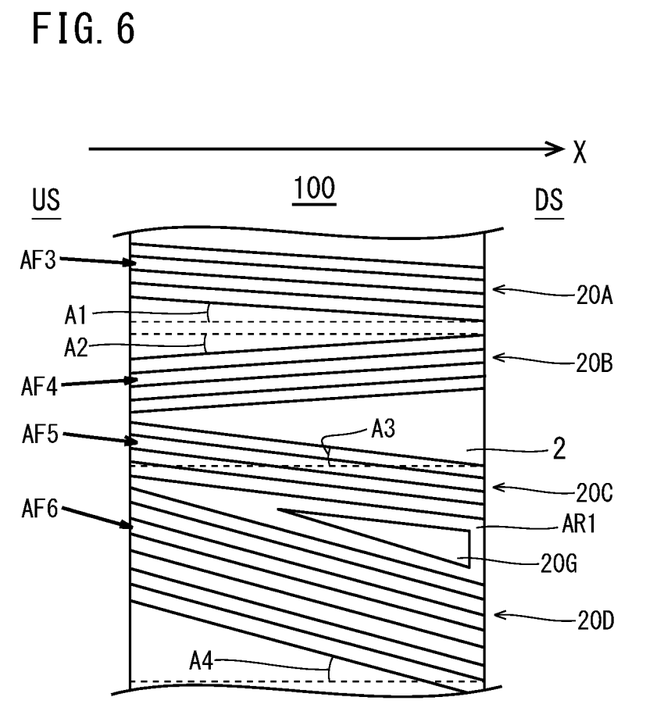
FIG. 6 is a plan view of a heat exchanger according to a second embodiment.

Referring to FIG. 6, a heat exchanger 100 according to the present embodiment includes a plurality of heat dissipating fin groups 20A to 20D in place of the plurality of heat dissipating fins 20, unlike the heat exchanger 1. The other configurations are the same as those of the heat exchanger 1.

Each of the heat dissipating fin groups 20A to 20D includes a plurality of heat dissipating fins. The plurality of heat dissipating fins in the same heat dissipating fin group extend from the inlet side US of the heat exchanger 100 toward the outlet side DS thereof. Each of the heat dissipating fins in the same heat dissipating fin group, when viewed along the direction of a normal to the surface 2 on which the heat dissipating fins are arranged (that is, in FIG. 6), intersects the axis of rotation X at the same intersection angle. For example, the plurality of heat dissipating fins in the heat dissipating fin group 20A all intersect the axis of rotation X at an intersection angle A1. Similarly, the heat dissipating fins in the heat dissipating fin group 20B intersect the axis of rotation X at an intersection angle A2. The heat dissipating fins in the heat dissipating fin group 20C intersect the axis of rotation X at an intersection angle A3. The heat dissipating fins in the heat dissipating fin group 20D intersect the axis of rotation X at an intersection angle A4.

Each of the heat dissipating fin groups 20B to 20D intersects the axis of rotation X at an intersection angle different from the intersection angle at which the heat dissipating fin group 20A intersects the axis of rotation X. That is, the intersection angles A1 to A4 differ from one another.

The heat dissipating fin groups correspond to swirl flows AF3 to AF6, which flow in different directions. The plurality of heat dissipating fins in the heat dissipating fin group 20A extend along the swirl flow AF3 flowing over the surface 2 in a direction that intersects the axis of rotation X at the intersection angle A1. The plurality of heat dissipating fins in the heat dissipating fin group 20B extend along the swirl flow AF4 flowing over the surface 2 in a direction that intersects the axis of rotation X at the intersection angle A2. Similarly, the plurality of heat dissipating fins in the heat dissipating fin group 20C extend along the swirl flow AF5 flowing over the surface 2 in a direction that intersects the axis of rotation X at the intersection angle A3, and the plurality of heat dissipating fins in the heat dissipating fin group 20D extend along the swirl flow AF6 flowing over the surface 2 in a direction that intersects the axis of rotation X at the intersection angle A4.

As described above, the heat exchanger 100 includes the plurality of heat dissipating fin groups 20A to 20D corresponding to the swirl flows AF3 to AF6, as described above. Therefore, even in the case where the plurality of swirl flows AF3 to AF6 travel in different directions over the surface 2, the swirl flows are allowed to tend to flow between the plurality of heat dissipating fins, whereby the heat exchange ratio is increased.

In the case where a plurality of heat dissipating fin groups that interest one another at different intersection angles are formed on a surface, heat dissipating fin groups adjacent to each other have a widening area therebetween, such as an area AR1. To avoid the wide inter-group area, a path bifurcating member 20G may be disposed in the area AR1. The path bifurcating member 20G has a triangular shape having three sides in a plan view. The side adjacent to the heat dissipating fin group 20C extends along the heat dissipating fin group 20C, and the side adjacent to the heat dissipating fin group 20D extends along the heat dissipating fin group 20D. The path bifurcating member 20G causes the swirl flow passing over the area AR1 to bifurcate and pass by. In a case where the heat dissipating fins 20 are formed in a cutting process, the path bifurcating member 20G can also be formed in the cutting process. In this case, the formation of the path bifurcating member 20G allows reduction in the amount of cutting operation.

In the present example, the plurality of heat dissipating fin groups 20A to 20D, which intersect one another at different intersection angles, are disposed on the surface 2. It is, however, noted that a plurality of heat dissipating fin groups that intersect one another at different intersection angles may be disposed on the surface 3 in place of the surface 2, or a plurality of heat dissipating fin groups that intersect one another at different intersection angles may be disposed on each of the surfaces 2 and 3.

Third Embodiment

In the embodiments described above, the heat dissipating fins extend along the swirl flow flowing over the surfaces of the heat exchanger over the entire length thereof. It is, however, noted that the advantageous effect described above is achieved to some extent as long as part of the heat dissipating fins or at least a portion disposed on the swirl flow entry side (inlet side US) (hereinafter referred to as inlet-side section) extends along the swirl flow. In this case, the inlet-side section extends in a direction that intersects the axis of rotation X.

Figure 7:
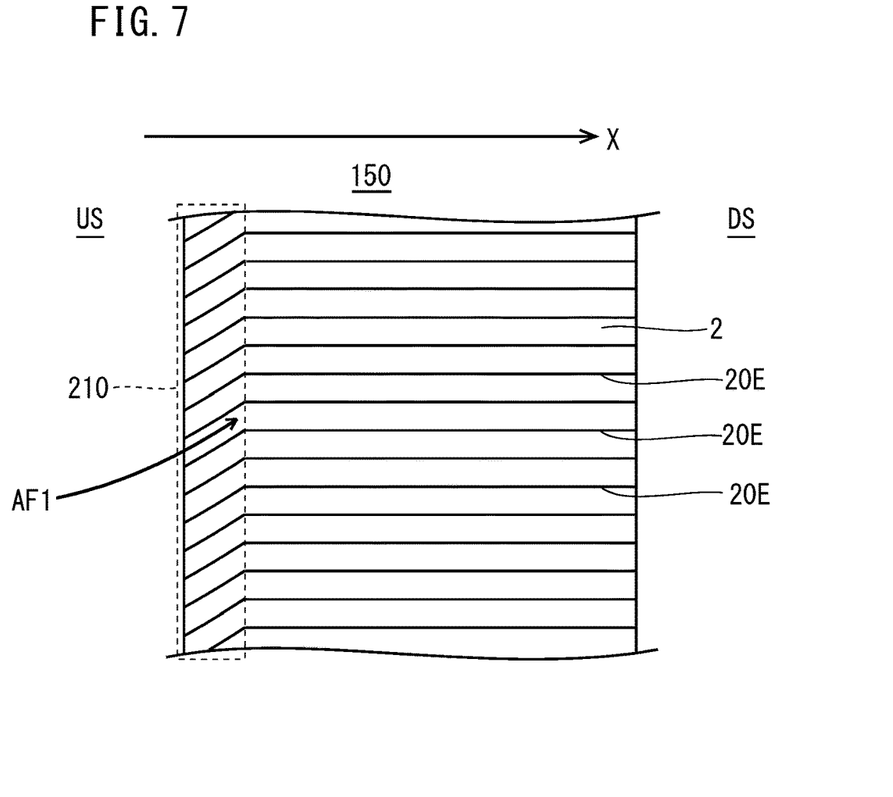
FIG. 7 is a plan view of a heat exchanger according to the second embodiment.
Figure 8:
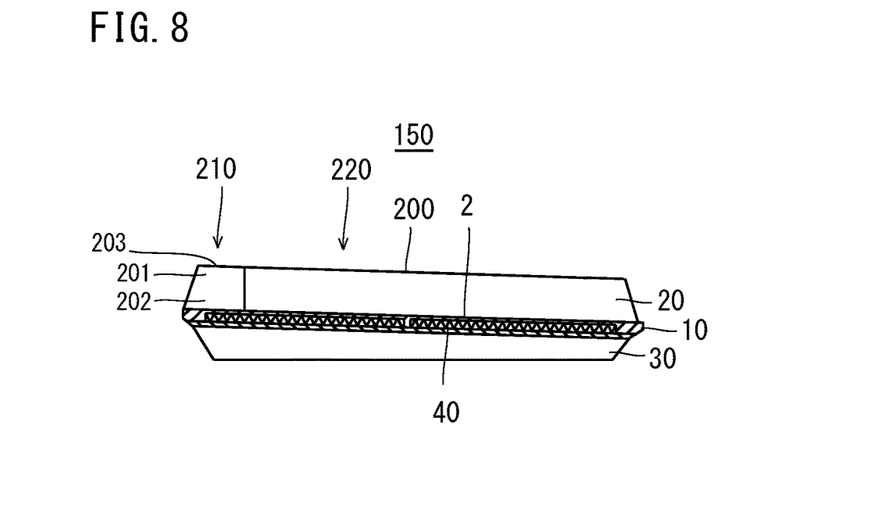
FIG. 8 is a side view of the heat exchanger shown in FIG. 7.

FIG. 7 is a plan view of a heat exchanger 150 according to a third embodiment, and FIG. 8 is a side view of the heat exchanger 150. The side view of FIG. 8 shows a cross section of the main body 10. In FIGS. 7 and 8, a form of the heat dissipating fins on the surface 2 is described by way of example, and the same holds true for the case where the surface 3 includes heat dissipating fins.

Referring to FIGS. 7 and 8, a plurality of heat dissipating fins 20E have an inlet-side section 210, which is disposed on the side where the swirl flow AF1 flows in (inlet side US), and a remainder 220, which is the portion other than the inlet-side section 210. In the present embodiment, the inlet-side section 210 extends along the swirl flow AF1, and the remainder 220 extends along the axis of rotation X. Even in this case, the swirl flow AF1 is unlikely to collide with the inlet-side section 210 of the heat dissipating fins 20E but is likely to flow between the plurality of heat dissipating fins 20E. The swirl flow AF1 is therefore likely to flow to some extent between the plurality of heat dissipating fins 20E. As a result, the heat exchange ratio is increased.

The inlet-side section 210 is an inlet-side portion of the heat dissipating fins 20E and has an inlet-side upper section 201 and an inlet-side lower section 202. The inlet-side lower section 202 corresponds to a root portion of the heat dissipating fins 20 and is fixed to the surface 2. The inlet-side upper section 201 is located on the inlet-side lower section 202 and has an inlet-side upper edge 203. The inlet-side upper edge 203 corresponds to an inlet-side portion of the upper edge 200 of the heat dissipating fins 20. In FIGS. 7 and 8, since the inlet-side section 210 extends along the swirl flow AF1, the inlet-side upper edge 203 also extends along the swirl flow AF1. It is more preferable that the inlet-side upper edge 203 has a length 20% of the overall length of the heat dissipating fins or more.

Figure 9:
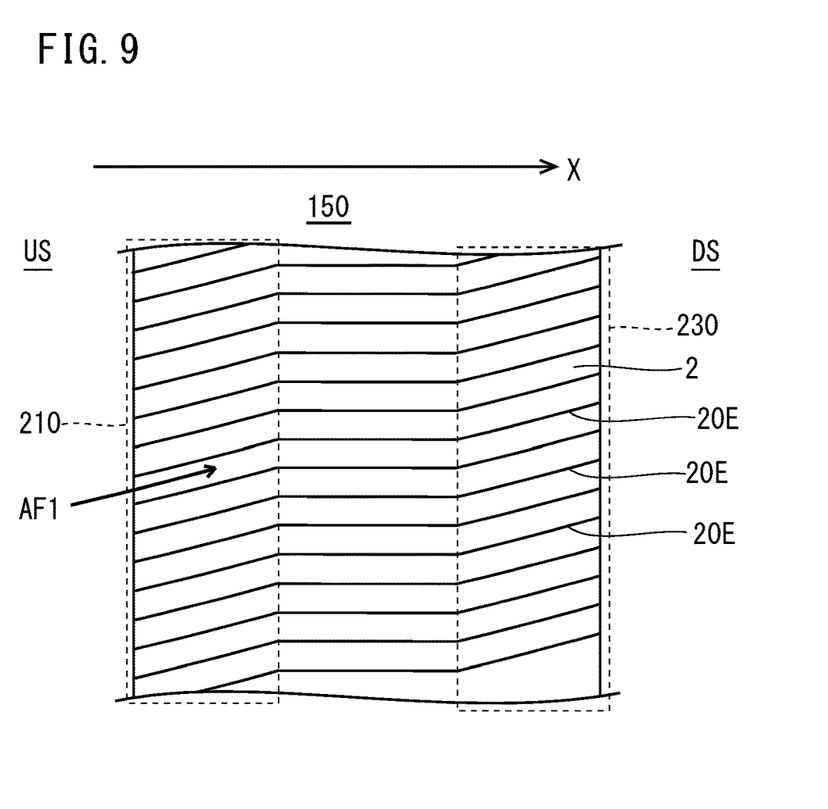
FIG. 9 is a plan view of a heat exchanger different from the heat exchanger shown in FIG. 7.
Figure 10:
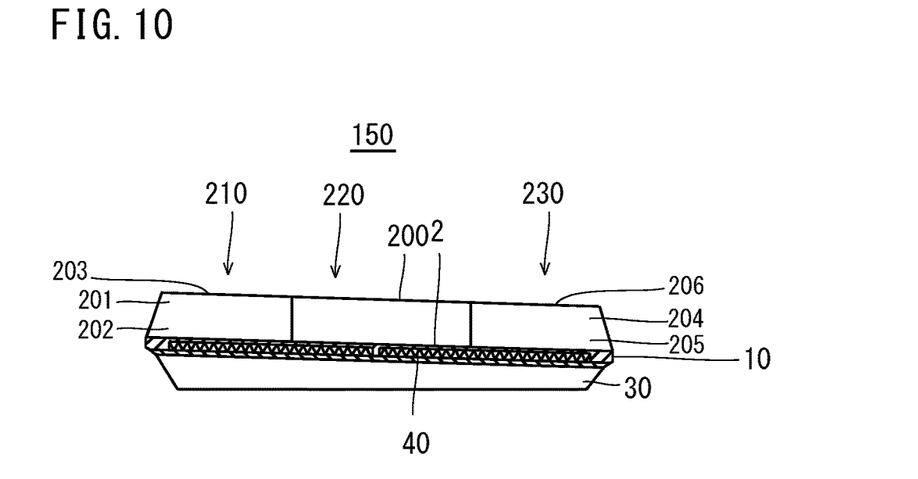
FIG. 10 is a side view of the heat exchanger shown in FIG. 9.

In FIGS. 7 and 8, only the inlet-side section of the heat dissipating fins extends along the swirl flow AF1. Instead, not only may the inlet-side section 210 of the heat dissipating fins 20E extend along the swirl flow AF1 but also the portion (hereinafter referred to as outlet-side section) 230 on the side where the swirl flow AF1 flows out (outlet side DS) may extend along the swirl flow AF1, as shown FIGS. 9 and 10. The outlet-side section 230 is part of the heat dissipating fins 20E or a portion out of which the swirl flow AF1 flows and has an outlet-side upper section 204 and an outlet-side lower section 205, as shown in FIG. 10. The outlet-side lower section 205 corresponds to a root portion of the heat dissipating fins 20E and is fixed to the surface 2. The outlet-side upper section 204 is located on the outlet-side lower section 205 and has an outlet-side upper edge 206. The outlet-side upper edge 206 corresponds to an outlet-side portion of the upper edge 200 of the heat dissipating fins 20E. In FIGS. 9 and 10, since not only the inlet-side section 210 but also the outlet-side section 230 extends along the swirl flow AF1, the inlet-side upper edge 203 and the outlet-side upper edge 206 also extend along the swirl flow AF1. In the present example, since the inlet-side section 210 and the outlet-side section 230 extend along the swirl flow AF1, the heat exchange ratio is increased. It is more preferable that the outlet-side upper edge 203 has a length that ranges from 20% to 50% of the overall length of the heat dissipating fins.

Fourth Embodiment

In the embodiments described above, the inlet-side section of the heat dissipating fins or the inlet-side section and the outlet-side section of the heat dissipating fins extend along the swirl flow flowing over a surface of the heat exchanger, and the remainder of the heat dissipating fins extends along the axis of rotation X. It is, however, noted that the swirl flow tends to flow into the spaces between the heat dissipating fins as long as at least the inlet-side upper edge of the heat dissipating fins extends along the swirl flow, and the heat exchange ratio is therefore increased.

Figure 11A:
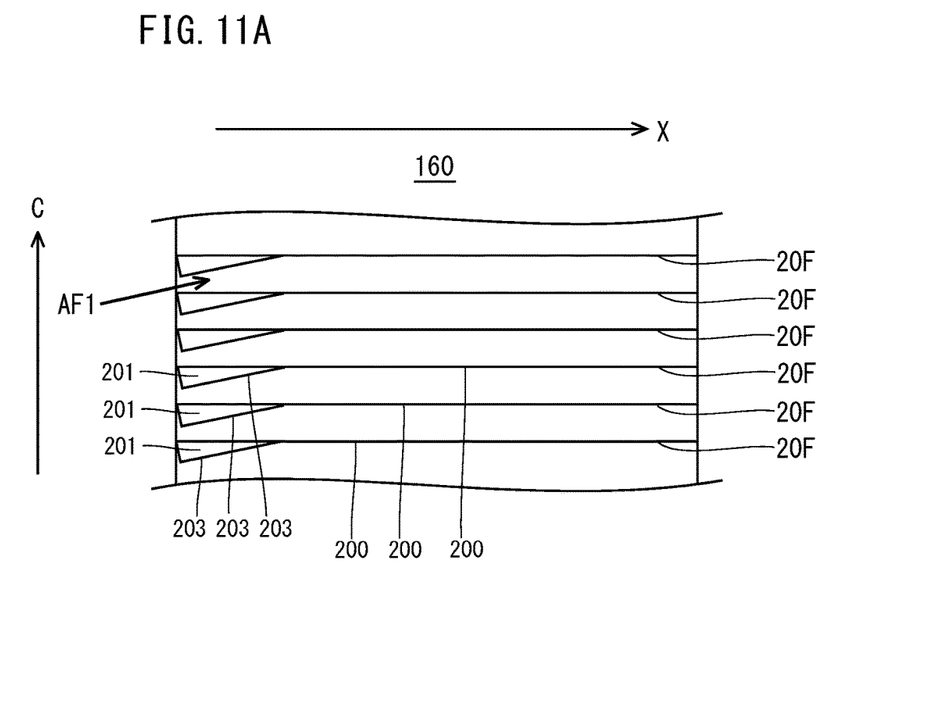
FIG. 11A is a plan view of a heat exchanger according to a fourth embodiment.
Figure 11B:
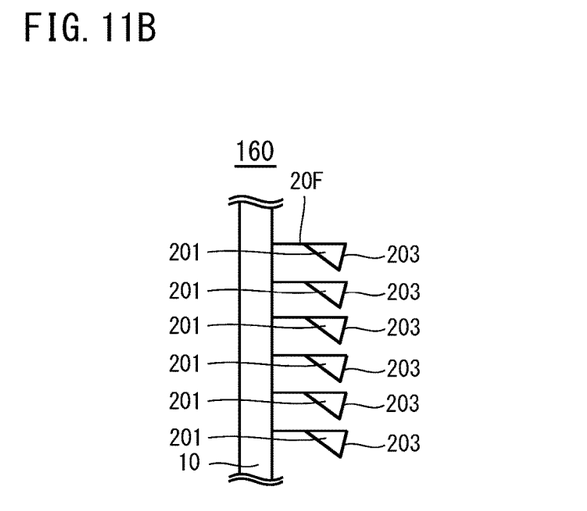
FIG. 11B is a front view of the heat exchanger shown in FIG. 11A viewed along the direction of the axis of rotation of a fan from the upstream side toward the downstream side.

FIG. 11A is a plan view of the surface 2 of a heat exchanger 160 according to the present embodiment viewed from above, and FIG. 11B is a front view of the heat exchanger 160 viewed along the direction of the axis of rotation X from the upstream side toward the downstream side. Referring to FIGS. 11A and 11B, the heat exchanger 160 includes a plurality of heat dissipating fins 20F on the surface 2, and the plurality of heat dissipating fins 20F are arranged in the circumferential direction C of the aircraft engine. A portion including the inlet-side upper edge 203 of each of the heat dissipating fins 20F (inlet-side upper section 201) is bent in the direction in which the plurality of heat dissipating fins 20F are arranged. The other portion of the heat dissipating fins 20F (remainder 220) extends in the direction of the axis of rotation X. Therefore, in this case, the root of the inlet-side section of each of the heat dissipating fins 20F (inlet-side lower section) extends in the direction of the axis of rotation X.

Also even in this case, when the surface 2 on which the heat dissipating fins 20F are arranged is viewed along the direction of a normal to the surface 2 (that is, referring to FIG. 11A), the inlet-side upper edge 203 of each of the heat dissipating fins 20F extends along the swirl flow AF1. The swirl flow AF1 therefore tends to flow into the spaces between the heat dissipating fins 20F, whereby the heat exchange ratio is increased. Further, in this case, the heat dissipating fins 20F can be readily formed only by bending the inlet-side upper section 201 of each of the heat dissipating fins, which extend along the axis of rotation X.

Figure 12A:
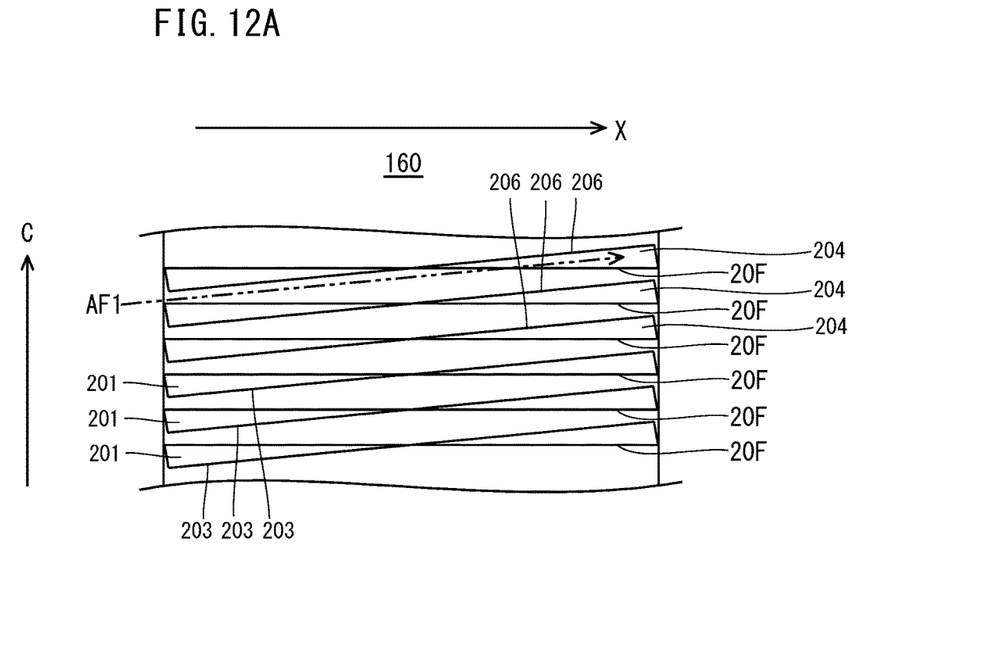
FIG. 12A is a plan view of a heat exchanger different from the heat exchanger shown in FIG. 11.
Figure 12B:
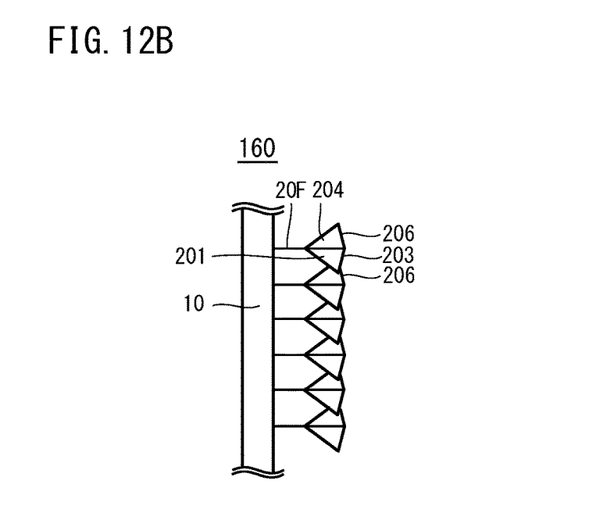
FIG. 12B is a front view of the heat exchanger shown in FIG. 12A viewed along the direction of the axis of rotation of a fan from the upstream side toward the downstream side.

Further, a portion (inlet-side upper section) 201 including the inlet-side upper edges 203 of the heat dissipating fins 20F may be so bent in the direction in which the heat dissipating fins 20F are arranged as to extend along the swirl flow AF1, and a portion (outlet-side upper section) 204 including the outlet-side upper edges 206 of the heat dissipating fins 20F may be so bent toward the side opposite the inlet-side upper section 201 as to extend along the swirl flow AF1, as shown in FIGS. 12A and 12B. In this case, the inlet-side upper edges 203 and the outlet-side upper edges 206 extend along the swirl flow AF1. The swirl flow AF1 therefore tends to flow into the spaces between the heat dissipating fins 20F, and the heat exchange ratio is therefore increased.

Figure 13:
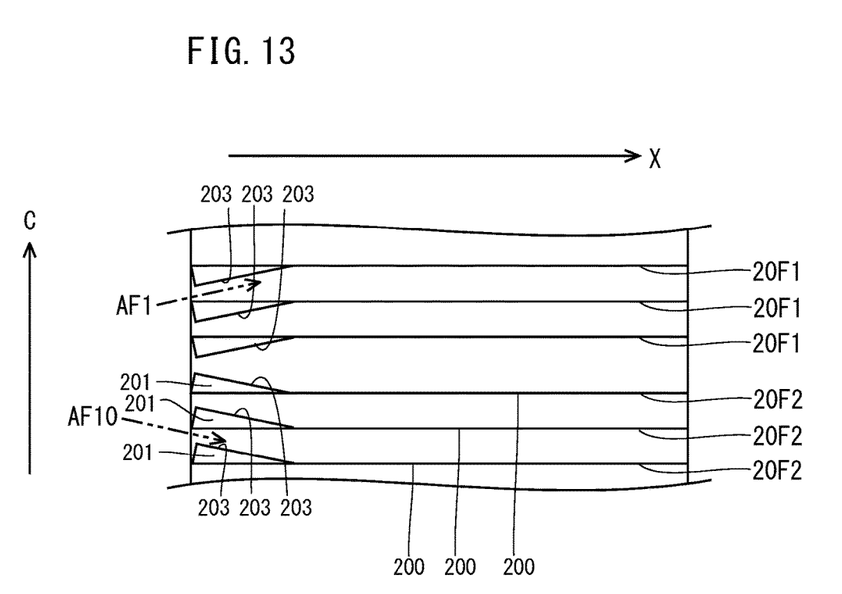
FIG. 13 is a plan view of another heat exchanger different from the heat exchangers shown in FIGS. 11 and 12.

Further, in a case where the swirl flow AF1 and swirl flow AF10, which flow in different directions, flow over the surface 2, a plurality of heat dissipating fin groups having inlet-side upper edges 203 extending along the swirl flows may be formed, as shown in FIG. 13. In FIG. 13, in the heat dissipating fin group being a plurality of heat dissipating fins 20F1, inlet-side upper sections 201 are so bent in the direction in which the heat dissipating fins are arranged that the inlet-side upper edges 203 extend along the swirl flow AF1. Further, in the heat dissipating fin group being a plurality of heat dissipating fins 20F2, the inlet-side upper sections 201 are so bent in the direction in which the heat dissipating fins are arranged that the inlet-side upper edges 203 extend along the swirl flow AF10. In this case, since the inlet-side upper edges of the heat dissipating fin groups extend along the corresponding swirl flows AF1 and AF10, the swirl flows AF1 and AF10 tend to flow into the spaces between the plurality of heat dissipating fins 20F1 and 20F2, respectively. The heat exchange ratio is therefore increased.

In FIGS. 11A to 13, the heat dissipating fins on the surface 2 have been described. The same description in FIGS. 11A to 13 holds true even for a case where the heat dissipating fins are arranged on the surface 3.

In any of the embodiments described above, the inlet-side upper edge of each of the heat dissipating fins formed on one of the surfaces 2 and 3 extends along the swirl flow. In this case, since the swirl flow tends to flow into the spaces between the plurality of heat dissipating fins, the distance over which the swirl flow comes into contact with the heat dissipating fins increases. The heat exchange ratio is therefore increased.

Out of the plurality of heat dissipating fins, the dimensions of heat dissipating fins adjacent to each other (fin height, fin thickness, and inter-fin distance) are determined in accordance with the amounts of features of a swirl flow (flow speed, flow rate, and flow direction, for example). For example, the inter-fin distance in a portion where the swirl flow flows at high speed is increased, whereas the inter-fin distance in a portion where the swirl flow flows at low speed is decreased. In this case, pressure loss can be reduced.

The embodiments of the present invention have been described. The embodiments described above are, however, presented only by way of example for implementing the present invention. The present invention is not therefore limited to the embodiments described above but can be implemented with changes in the embodiments as appropriate to the extent that the changes do not depart from the substance of the present invention.

REFERENCE SIGNS LIST 1, 100, 150, 160: Heat exchanger
2, 3: Surface
10: Main body
20, 20A to 20F, 30, 300: Heat dissipating fins
AF1 to AF6, AF10: Swirl flow

The invention claimed is:

1. A heat exchanger for an aircraft engine that is allowed to be disposed on a curved surface which is part of the aircraft engine and along which a swirl flow flows, the heat exchanger comprising:
   a main body that has a plate-like shape curved along the curved surface, includes an internal channel through which a fluid is allowed to flow, and has a first surface so disposed as to face the curved surface and a second surface on a side opposite the first surface; and
   a plurality of heat dissipating fins that are arranged on at least one of the first and second surfaces, wherein
   the heat dissipating fin has a plate-like shape and has an inlet-side upper edge disposed on a side where the swirl flow flows in and an outlet-side upper edge disposed on a side opposite the inlet-side upper edge and on a side where the swirl flow flows out,
   the inlet-side upper edge intersects an axis of rotation of a fan of the aircraft engine and extends along a direction in which the swirl flow flows at the inlet-side upper edge,
   the plurality of heat dissipating fins include
   first heat dissipating fins each so configured that at least the inlet-side upper edge intersects the axis of rotation at a first intersection angle, and
   second heat dissipating fins arranged on the surface on which the first dissipating fins are arranged and each so configured that at least the inlet-side upper edge intersects the axis of rotation at an intersection angle different from the first intersection angle.

2. The heat exchanger according to claim 1, wherein the outlet-side upper edge intersects the axis of rotation of the fan and extends along the direction in which the swirl flow flows at the outlet-side upper edge.

3. The heat exchanger according to claim 1, wherein the first heat dissipating fins intersect the axis of rotation at the first intersection angle over the entire length thereof, and
the second heat dissipating fins intersect the axis of rotation at an intersection angle different from the first intersection angle over the entire length thereof.

4. The heat exchanger according to claim 1, wherein a portion including the inlet-side upper edge of the heat dissipating fin is bent.

5. The heat exchanger according to claim 2, wherein a portion including the inlet-side upper edge of the heat dissipating fin is bent, and a portion including the outlet-side upper edge of the heat dissipating fin is bent toward a side opposite the portion including the inlet-side upper edge.

6. The heat exchanger according to claim 1, wherein the plurality of heat dissipating fins are arranged on the first and second surfaces.

7. The heat exchanger according to claim 2, wherein
the first heat dissipating fins intersect the axis of rotation at the first intersection angle over the entire length thereof, and
the second heat dissipating fins intersect the axis of rotation at an intersection angle different from the first intersection angle over the entire length thereof.

* * * * *